(12) United States Patent
Bauknecht et al.

(10) Patent No.: US 6,651,336 B1
(45) Date of Patent: Nov. 25, 2003

(54) METHOD FOR PRODUCING A PLANET CARRIER

(75) Inventors: Gert Bauknecht, Immenstaad (DE); Alfred Skrabs, Sitterswald (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/049,126

(22) PCT Filed: Sep. 15, 2000

(86) PCT No.: PCT/EP00/09007

§ 371 (c)(1),
(2), (4) Date: Feb. 7, 2002

(87) PCT Pub. No.: WO01/21984

PCT Pub. Date: Mar. 29, 2001

(30) Foreign Application Priority Data

Sep. 21, 1999 (DE) .......................... 199 45 242

(51) Int. Cl.⁷ .............................. B23P 15/14
(52) U.S. Cl. ............................................. 29/893
(58) Field of Search ................. 29/893, 893.1, 29/893.2, 509, 520, 524.1

(56) References Cited

U.S. PATENT DOCUMENTS

| | | | |
|---|---|---|---|
| 3,958,389 A | 5/1976 | Whiteside et al. | 52/758 D |
| 4,043,021 A | 8/1977 | Mosbacher et al. | 29/437 |
| 4,642,869 A | 2/1987 | Muller | 29/432.2 |
| 5,579,568 A | * 12/1996 | Hudson et al. | 29/509 |
| 5,658,215 A | 8/1997 | Premiski et al. | 29/509 |
| 5,910,066 A | 6/1999 | Schulz et al. | 475/336 |

FOREIGN PATENT DOCUMENTS

| | | | |
|---|---|---|---|
| CH | 415 215 | 12/1966 | |
| DE | 697 557 | 10/1940 | |
| DE | 2 244 945 | 3/1974 | ........... B21D/39/00 |
| DE | 34 04 118 A1 | 8/1985 | ........... B23P/19/00 |
| DE | 32 03 077 C2 | 8/1989 | ........... B23P/19/00 |
| DE | 43 25 295 A1 | 2/1995 | ............. F16H/1/28 |
| DE | 195 10 499 A1 | 9/1996 | ............. F16H/1/36 |
| DE | 196 48 124 A1 | 6/1998 | ........... F16H/57/08 |
| DE | 197 11 423 C1 | 9/1998 | ........... F16H/57/08 |
| GB | 949987 | 2/1964 | |
| JP | 04341641 A | 11/1992 | |
| JP | 08170695 | 7/1996 | ............. F16H/1/28 |

OTHER PUBLICATIONS

Pitz, Ing. Helmut, "Von Lageraugen mit Blechwänden", *Der Maschinenbau* 6, 1956, pp. 173–174.

Frauchiger, Paul, "From Design to Process, Part . . . Seamlessly", *Automotive Engineering International*, US, SAE International, Bd 106, No. 2, Feb. 1, 1998, pp. 105–108 ISSN:0098–2571.

* cited by examiner

*Primary Examiner*—P. W. Echols
(74) *Attorney, Agent, or Firm*—Davis & Bujold, PLLC

(57) ABSTRACT

The method for producing a planet carrier for a planetary gear which has one spider shaft (1) and two guide plates (2, 3) disposed parallel to each other consists in that the guide plates (2, 3) are produced as precision blanked parts and that each of two guide plates (2, 3) located upon the spider shaft (1) are interconnected in one stroke in a pressing process via rivets (4), that in the shoulders (9) of the rivets (4) provided with tappets (5) annular projections (7, 8) are fashioned and that the tool (6) of the press impinging on the guide plates (2, 3) in direction of the shoulders (9) is provided with an annular projection (7) adapted to the annular projection.

6 Claims, 2 Drawing Sheets

METHOD FOR PRODUCING A PLANET CARRIER

FIELD OF THE INVENTION

This invention relates to a method for producing a planet carrier for a planetary gear which has a sun gear, one or two ring gears, at least one planetary gear and one input shaft.

BACKGROUND OF THE INVENTION

Many problems that arise in the operating technology like in transmissions of motor vehicles demand the implementation of extreme ratios. Planetary gears are specially well suited to combine high ratios with a compact design. As an example of this let mention be made of the so-called Wolfrom coupling gear which with a high ratio has high efficiency. A Wolfrom gear is a very simple coupling gear. The input shaft is connected with a sun gear which interacts with a planetary wheel set. The planetary gear set supports itself on an internally toothed ring gear firmly connected with the housing wherein as planet carrier rotates idly. The movement is relayed via the planet carrier and the planetary gear which is designed, for example, as step planet. The planetary gear for its part meshes again with a second internally toothed ring gear which constitutes the output.

Such a planetary gear is adequate for a compact design which on a narrow space permits high transmission densities.

Gears with high ratios are especially needed in handling technology for power transmission of high-speed prime movers. The gears should have, upon a change of load direction, a small torsional play. They must also have an anti-torsional, light and compact structure.

The Applicant's DE A 195 10 499 has disclosed a planetary gear having a driven sun gear, a first and a second internally toothed ring gear of which the first is stationary and the second is rotationally operable and forms the output, and planetary gears which upon axles that extend slopingly are supported in a planet carrier so as to be in constant tooth contact with the sun gear and the ring gear. The planetary gears are designed as step planets with small and large step wheels, the teeth of the step wheels having different units.

From the Applicant's DE A 43 25 295 is known another planetary gear having a driven sun gear and two internal ring gears. In this planetary gear the planetary gears, supported on axles in the planet carrier, are disposed slopingly forming an acute angle relative to a central axle of the planetary gear. The planet carrier which here follows idly is supported with low friction via a ball bearing upon a bushing, which bushing abuts, for adjusting the axial position of the planet carrier, on one end via a shoulder on a ball bearing and via a safety ring can be fixed on a spacer disc.

Hereby is created a planetary gear free of play in which can be achieved in the production a great precision which forms the basis for a tight play adjustment.

An essential part of such a planetary gear is the planet carrier which as a rule consists of a forged part and a punched or precision blanked guide plate which are welded with each other. This method of production requires a multiplicity of process steps including an additional welding process.

On account of the distortion of the parts which often occurs during welding, a reprocessing of the planet carrier is needed after the production.

Cast planet carriers have already been used also, but their production requires a likewise high expenditure in processing. To this must be added that the cast molds needed for producing the cast planet carriers have less service life than the shaping tools required for the precision blanking of the guide plates.

The problem on which the invention is based is to provide a method for production of a planet carrier which is considerably easier to carry out so that the costs of production for the planet carrier can be reduced.

SUMMARY OF THE INVENTION

It is therefore provided according to the invention that in a press and by means of annular projections, a plurality, preferably two, of guide plates with a number of rivets corresponding to the number of planet gears to be contained be aligned, joined together and riveted with each other in one stroke. The guide plates are here produced as precision blanked parts wherein each of two guide plates situated upon a spider shaft is interconnected with a number of rivets corresponding to the number of planets to be contained by working into the shoulders of the tappets an annular projection concentrically surrounding a longitudinal axle of the rivet bolt; the tool of the press that impinges upon the guide plate in direction of the shoulders is likewise provided with an annular projection which has the same geometry and thus is disposed precisely opposite to the annular projection so that during the rivet upset step no inadmissible deformation of the guide plate occurs outside the annular projection.

The interlinkable joining of the parts in the press creates considerable advantages relative to cost in comparison with the traditional casting and welding methods. One other advantage as to cost results from the fact that chips and the expensive disposal thereof are prevented.

An improvement in quality of the finished planet carrier can be obtained by a clearly small unbalance of the carrier, since it is possible without problem to obtain a riveting of precise position together with an elimination of the great forging tolerances.

Let it be further observed that the inventively produced planet carrier can be designed lighter than the traditional planet carriers whereby a reduction in weight is made possible.

BRIEF DESCRIPTION OF THE DRAWINGS

The invention will now be described, by way of example, with reference to the accompanying drawings in which.

Figure 1:
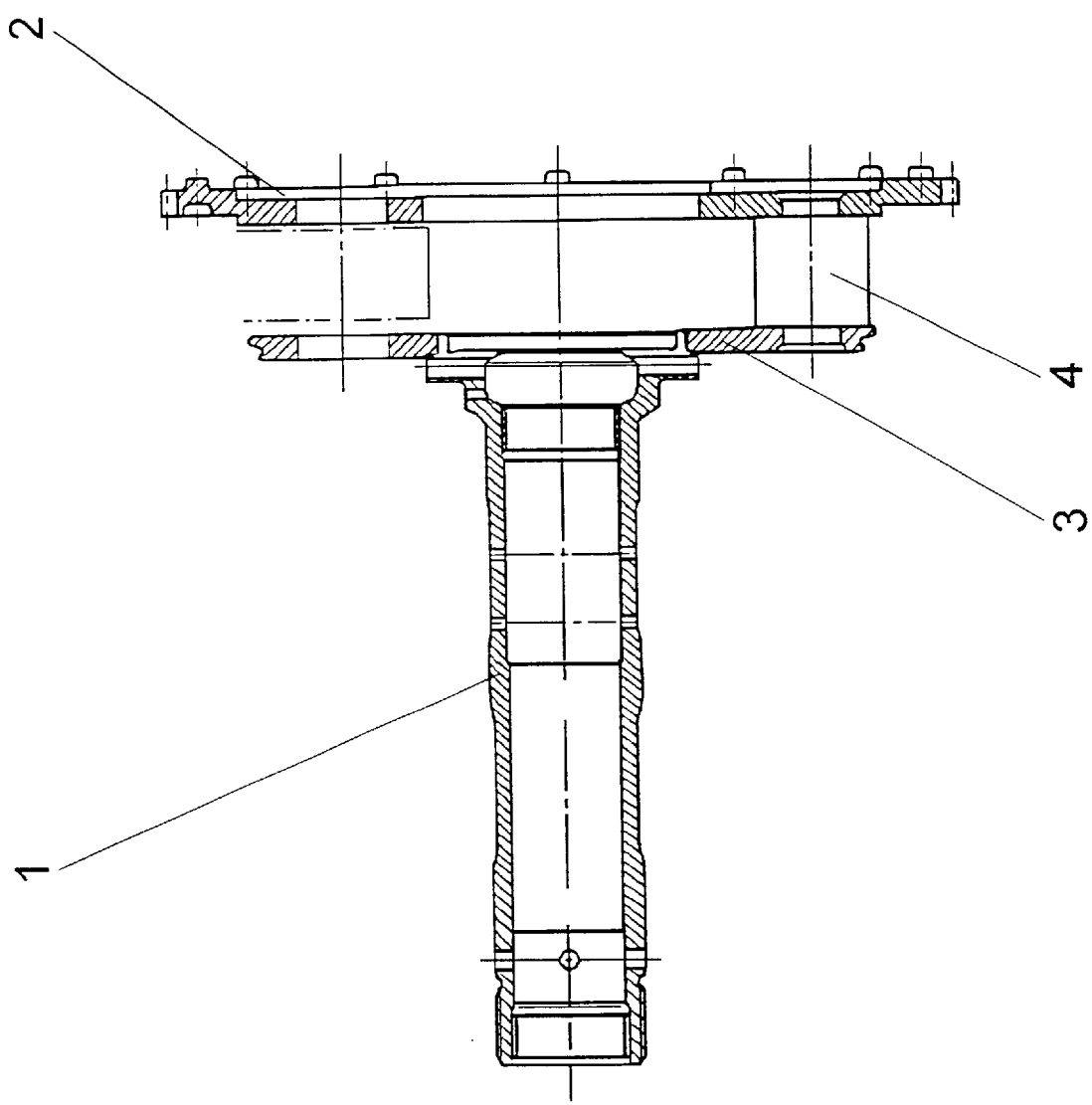
FIG. 1 is a cross section through a planet carrier.

In the planet carrier diagrammatically shown in FIG. 1, a traditional spider shaft 1 and two guide plates 2 and 3, produced as precision blanked parts, are spaced from each other and situated upon the spider shaft parallel to each other, the guide plates being interconnected with a number of rivets 4 equal to the number of planets to be contained.

Figure 2:
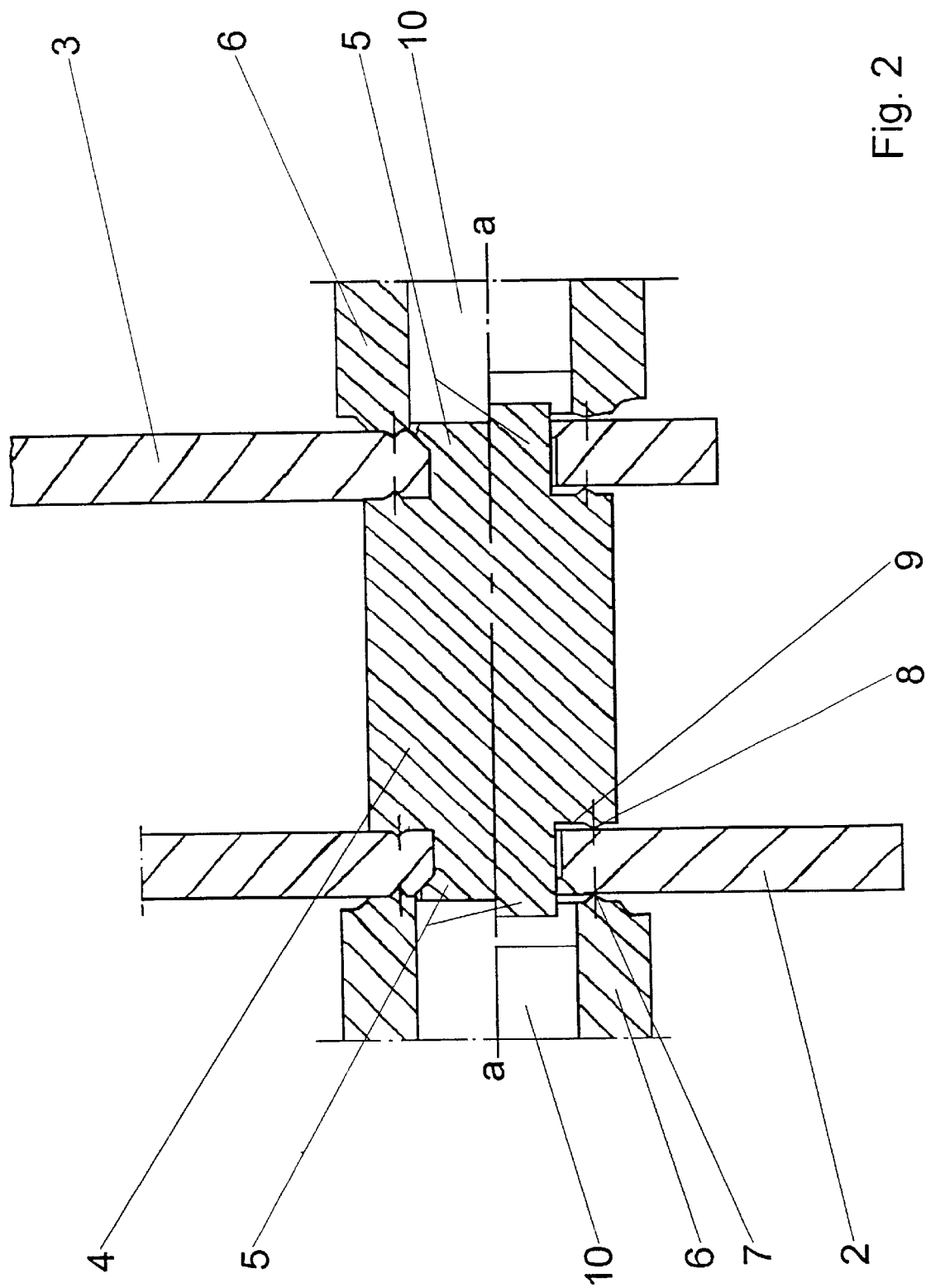
FIG. 2 is an enlarged representation of a rivet bolt before and after the rivet upset step is carried out.

FIG. 2 shows now an enlarged transverse section through one of the rivets 4 and parts of the two guide plates 2, 3 that it interconnects, there being shown on the right half of FIG. 2 the relative position of the parts prior to the rivet upset step and on the left half of FIG. 2, separated by the longitudinal axis a-a, the position of the parts relative to each other after termination of the rivet upset step.

Each rivet has on both of its ends a tappet 5 having a diameter smaller than the diameter of the rivet proper in the zone between the two guide plates 2, 3 so that on both sides of the rivet a shoulder 9 is formed upon which lies one of the guide plates 2, 3.

According to the invention, each shoulder 9 is now provided with one annular projection 8 that concentrically surrounds the tappet 5, specifically on both sides as shown in FIG. 2, that is, the side of the rivet facing the plate 2, and on the side of the rivet 4 facing the guide plate 3. A press includes a tool 6 which concentrically surrounds a punch 10 of said press, and the punch 10 and the tool 6, are movable independently of each other.

Upon the ends of the tools 6 facing the guide plates 2, 3, annular projections 7 are formed having a geometry identical to annular projections 8 in shoulders 9 of the rivet and lying precisely opposite to them. During the riveting step when therefore the tools 6 impinge upon the places facing it of the guide plates 2, 3, the material of the guide plates 2 and 3 is clamped so that during the rivet upset step of the tappets 5 no inadmissible deformation of the guide plates 2, 3 due to the punch 10 occurs outside the annular projections. By virtue of this inventive method the required geometric measures can be obtained without additional processing. In other words the special design with annular projection of the shoulders of the rivets and of the underside of the tools takes care that the space for upsetting the tappets in the material of the guide plates be limited.

| Reference numerals | |
|---|---|
| 1 spider shaft | 6 tool |
| 2 guide plate | 7 projection |
| 3 guide plate | 8 projection |
| 4 rivets | 9 shoulder |
| 5 tappet | 10 punch |

What is claimed is:

1. A method for producing a planet carrier for a planetary gear which has one sun gear, at least one ring gear, at least one planet gear and one input shaft, wherein said planet carrier has one spider shaft (1) and two guide plates (2, 3) interconnected in parallel and disposed spaced apart and parallel to each other, the method comprising the steps of:
   producing said guide plates (2, 3) as precision blanked parts with each of two guide plates (2, 3), situated upon said spider shaft (1), being interconnected by a press during a one stroke pressing process, with a number of rivets (4) equaling a number of planets to be supported by the planet carrier such that in shoulders (9) of said rivets (4) defined by tappets (5), annular projections (8) are integrated which concentrically surround a longitudinal axis of said rivets (4) and impinging the guide plates (2, 3), via a tool (6) of the press, in a direction of said shoulders (9) which are provided with an annular projection (7) having a similar geometry as the annular projection (8) and is disposed exactly opposite to the annular projection (8) of said shoulders (9) so that during the riveting step inadmissible deformation of said guide plates (2, 3), radially outside said annular projections (7, 8), is prevented from occurring.

2. The method according to claim 1, further comprising the step of concentrically surrounding a punch (10) with said tool (6) and deforming a free surface of said tappets (5) to rivet said guide plates (2, 3) together.

3. A method of producing a planet carrier for a planetary gear which has a sun gear, a ring gear, planet gears and an input shaft, in which the planet carrier has a spider shaft (1) and two guide plates (2, 3) disposed parallel to and spaced apart from one another, the method comprising the steps of:
   manufacturing the two guide plates (2, 3) as blanked parts;
   placing the two guide plates (2, 3) upon the spider shaft (1);
   connecting the two guide plates (2, 3) with one another by a plurality of rivets (4) during a one stroke pressing operation, with a number of the rivets (4) equaling to a number of the planetary gears of the planetary gear;
   forming a tappet surrounded by an annular shoulder (9) in each opposed end of the rivet (4), and integrating in each shoulder (9) an annular projection (8) which concentrically surrounds a longitudinal axis of the rivet (4); and
   forcing, via a tool (6), the two guide plates (2, 3) toward the shoulders (9) of the rivet (4) with the tool (6) having a leading surface carrying an annular projection (7) having a geometry similar to and disposed exactly opposite to the annular projection (8) of the rivet (4) so that during riveting of the rivet, inadmissible deformation of the two guide plates (2, 3) radially outside the annular projections (7, 8) is prevented from occurring.

4. The method according to claim 3 further comprising the step of concentrically surrounding a punch (10) with the tool (6) and deforming a free surface of the tappets (5) in order to rivet the two guide plates (2, 3) together.

5. The method according to claim 4, further comprising the step of clamping the two guide plates (2, 3) to prevent the punch (10) from deforming the two guide plates (2, 3) in a region radially outside the annular projections.

6. A method of producing a planet carrier for a planetary gear which has a sun gear, a ring gear, planet gears and an input shaft, in which the planet carrier has a spider shaft (1) and two guide plates (2, 3) disposed parallel to and spaced apart from one another, the method comprising the steps of:
   manufacturing the two guide plates (2, 3) as blanked parts;
   placing the two guide plates (2, 3) upon the spider shaft (1);
   connecting the two guide plates (2, 3) with one another by a plurality of rivets (4) with a number of the rivets (4) equaling to a number of the planetary gears of the planetary gear;
   forming a tappet at each opposed end of the rivet (4) surrounded by a shoulder (9), and the shoulder (9) having an annular projection (8) which is concentric with a longitudinal axis of the rivet (4); and
   using a tool (6), carrying an annular projection (7) having a geometry similar to and disposed opposite to the annular projection (8) of the rivet (4), to force the two guide plates (2, 3) toward the shoulders (9) of at least one of the rivets (4) so that during riveting of that at least one rivet (4), inadmissible deformation of the two guide plates (2, 3) radially outside the annular projections (7, 8) is prevented from occurring.

* * * * *